United States Patent [19]

Portmann

[11] 4,431,314
[45] Feb. 14, 1984

[54] PRESETTABLE DIGITAL TIME-PIECE DISPLAY SYSTEM

[75] Inventor: Hubert Portmann, Rothenburg, Switzerland

[73] Assignee: Ebauches S.A., Switzerland

[21] Appl. No.: 372,067

[22] Filed: Apr. 26, 1982

Related U.S. Application Data

[63] Continuation of Ser. No. 139,445, Apr. 11, 1980.

[30] Foreign Application Priority Data

Apr. 17, 1979 [CH] Switzerland .................... 3581/79

[51] Int. Cl.[3] .............................................. G04C 9/00
[52] U.S. Cl. ................................... 368/188; 340/805; 340/706; 368/187; 368/224
[58] Field of Search ............... 368/223, 224, 225, 226, 368/231, 69–70, 185, 186, 187, 188, 200; 340/706, 712, 365 C, 365 VL, 802

[56] References Cited

U.S. PATENT DOCUMENTS

| | | | |
|---|---|---|---|
| 3,975,897 | 8/1976 | Naito | 368/224 |
| 4,094,135 | 6/1978 | Nomura et al. | 368/224 |
| 4,112,429 | 9/1978 | Tsuha et al. | 340/365 C |
| 4,185,281 | 1/1980 | Silverstone | 340/706 |
| 4,199,726 | 4/1980 | Bukosky et al. | 368/200 |

Primary Examiner—Marshall M. Curtis
Attorney, Agent, or Firm—Allegretti, Newitt, Witcoff & McAndrews, Ltd.

[57] ABSTRACT

A multistage counter 3, 5, 7, 10 normally counts seconds pulses from a frequency divider 2. Counters 5 and 7 are units and tens minutes counters and are set by shifting a counter 21 by button B to provide a "1" on output 21d. When a button A is then held down the seconds pulses pass through gates 17 and 22 and count the units counter 5 up to the numeral 0. A flip-flop 19, 26 is then set to disable gate 22 and enable gate 23 so that the units counter stays at the numeral 0 and the tens counter advances to the desired value, when button A is released, which resets the flip-flop. Button A is pressed again to count the units counter from the numeral 0 to the desired value. The invention in one embodiment simplifies the setting of a digital watch and reduces the time (number of pulses) needed to preset the units and tens of minutes counters. The invention can be extended to more than two counters and used for counters other than in clocks and watches.

4 Claims, 1 Drawing Figure

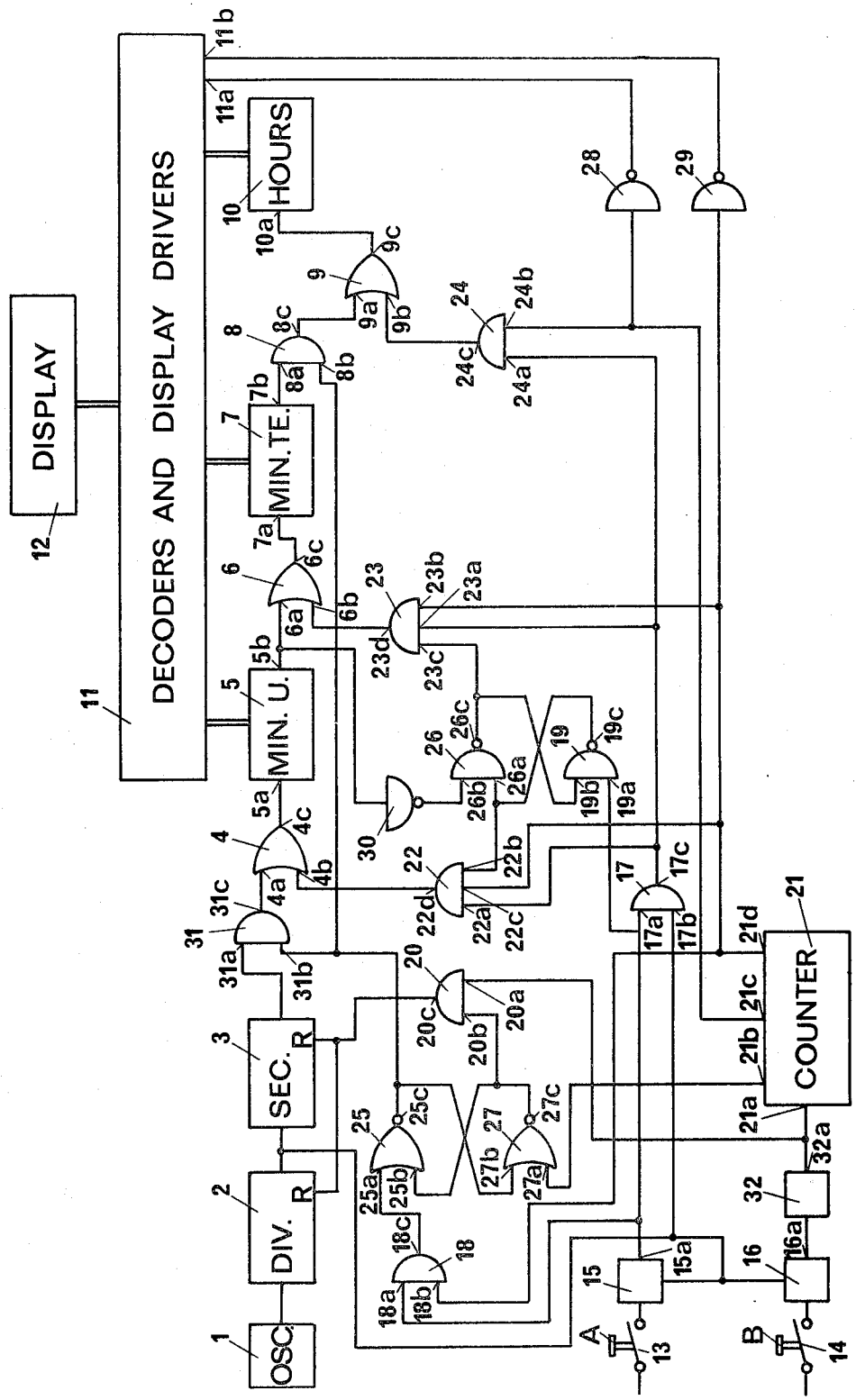

PRESETTABLE DIGITAL TIME-PIECE DISPLAY SYSTEM

This is a continuation of application Ser. No. 139,445 filed Apr. 11, 1980.

BACKGROUND OF THE INVENTION

The present invention relates to a digital display system. The invention is especially useful in the field of timepieces with a digital display, but it may also be used in many other fields, generally whenever it may be desirable to set a digital display to any selected value. The invention relates in a preferred embodiment to the setting of a timepiece having a presettable digital display.

The principal qualities sought in this kind of correction are simplicity and speed. Thus, the user is not happy if he has to select individually each of the digits of different significance which the number may comprise and then to cause the successive values of the selected digit to run off in sequence until the value which it is to take in the desired corrected number is reached. It is not seldom that he is obliged to make several attempts before arriving at the required result. He is still less happy when, as in those arrangements which are generally used at present, he must make all the values of the number run off unit by unit.

The object of the invention is to overcome these disadvantages by simplifying the necessary manipulations, in particular at the level of the selection of the digits in which intervention takes place. Moreover, the invention has the object of reducing the number of values which it is necessary to cause to run off in succession for each digit in order to effect a given change in the number and, therefore, of reducing the total duration of the changing operations.

This latter advantage makes itself felt above all in connection with the limitation of the speed of counting which the electronic circuits controlling the display may impose and with the minimum interval of time between two successive values which has to be allowed for the digits to appear legible in their new value. For example, if the values of the digits are visually displayed according to the state, coloured or not, of electrochromic segments forming the digits, the passage from one value to another demands in practice, for the electrochromic cells used at present, a time of the order of one second, taking account of the time necessary for the segments to be able to change state, that is to say for segments which are previously effaced or blanked out to be able to appear coloured and, conversely for segments in the coloured state to be able to be completely blanked out.

On the running-off of the displayed values in succession, the invention enables this relatively slow speed, which is essential for the quality of the display and easy reading of the digits, to be observed, while reducing the time necessary for correction.

BRIEF SUMMARY OF THE INVENTION

According to the present invention, there is provided a digital display system comprising a plurality of counters controlling display devices, and a setting arrangement for setting values in the counters individually in a plurality of successive operations in which the counters are caused to count through their states, the said arrangement being such that a first operation thereof causes one counter to count to and stay at a reference value and then causes a higher significance counter automatically to take up the counting for setting the higher significance counter, whereas a subsequent operation of the arrangement causes the said one counter to count from the reference value for setting the said one counter.

The simplest case in practising the invention is naturally that in which the number comprises only two digits. The invention, however, can also be applied to longer numbers comprising more than two digits, and the base of the numbers can be any value.

For the sake of convenience, reference will be made hereinafter to the case of the decimal system, the most commonly used in practice. In this case, it is particularly advantageous to make the units counter count up until a first reference value, which is zero units, is reached, and then to continue with the tens counter counting until a second reference value, which is zero tens, is reached, etc., until the most significant digit reaches the changed value desired for that digit. In this case, the procession of the number could appear as follows: 78, 79, 80, 90, 100, 200, etc.

However, it is also possible to chose for the first reference another value, for example, the first multiple of 5 reached by the number, and to select accordingly the following reference values, in this example the first multiple of 50 reached by the number, etc. In the given example, the procession of the number could appear in a manner similar to the following: 33, 34, 35, 40, 45, 50, 100, 150, 200, etc.

BRIEF DESCRIPTION OF THE DRAWING

The invention will be described, by way of example, with reference to the sole FIGURE of the accompanying drawing, which is a block diagram of a watch having an electrochromic display.

DETAILED DESCRIPTION OF THE PREFERRED EMBODIMENT

In the illustrative embodiment of the invention shown in the drawing, the watch comprises an oscillator 1 serving as a time base and delivering a signal at a precise frequency of, for example, 32kHz. This signal is applied to a frequency divider 2 which supplies pulses at a frequency of 1 Hz. These pulses are counted by a seconds counter 3 having a capacity of 60 and which therefore supplies one pulse per minute at its output.

The output of this counter 3 is connected to the input 31a of an AND gate 31, the output 31c of which is connected to the input 4a of an OR gate 4. The output of the gate 4 is connected to the input 5a of a minutes unit counter 5 formed in conventional manner by four flip-flops connected as a BCD counter stage.

The counter 5 has an output 5b at which a pulse appears, in normal operation, every time it passes from its stage 9 to its stage 0, that is to say every 10 minutes. This output 5b is connected to the input 6a of an OR gate 6, the output 6c of which is connected to the input 7a of a tens-of-minutes counter 7 formed in conventional manner by three flip-flops interconnected in such manner that, in response to the pulses which it receives at its input 7a, it adopts six different states corresponding to the decimal digits 0 to 5.

The output 7b of the counter 7, which delivers a pulse every time it passes from its state 5 to its state 0, that is to say once per hour in normal operation, is connected to the input 8a of an AND gate 8, the output 8c of which is connected to the input 9a of an OR gate 9. The output 9c of the gate 9 is connected to the input 10a of an hours counter 10 formed by four flip-flops interconnected in such manner that the counter 10 can adopt twelve different states corresponding to the decimal numbers 1 to 12, in the usual manner of displaying the hours.

The information available in binary form at the outputs of the counters 5, 7 and 10 is applied to a circuit 11 including decoders and drivers for a display device 12 which can include four 7-segment display elements for the four decimal digits making up the hours and minutes value. The decoders, drivers and display device can be entirely conventional and need not be described in detail here.

The circuit 11 has two control inputs 11a and 11b to both of which a logical "1" signal must be applied for the display to be visible. A logical "0" signal at the inputs 11a and 11b causes the blanking out of the digits indicating the minutes and the hours respectively, e.g., by disabling the corresponding drivers.

The circuits which have so far been described are the only ones which are used in normal operation, outside the periods of correction.

Referring to a display making use of electrochromic cells, for which the illustrative arrangement described is especially adapted, it will be briefly called to mind that the decoders determine the state, effaced or coloured, that the drivers must cause each of the different electrode segments of the electrochromic cells to adopt as a function of the state of the counters 5, 7 and 10. These segments, the number of which is generally six or seven for each of the decimal digits of the numbers displayed, are arranged and distributed over the display area in such manner as to cause the appearance of one or the other of the different values which the digits can take according to those of the segments which are in the coloured state. The colouring of a segment is obtained by injecting an electric charge into it and it is effaced or blanked-out injecting an opposite charge into it or by short-circuiting it to a counter-electrode. To reduce the consumption of energy, the display drivers are provided with circuits which, every time that the appearance of the display is to charge, enable the state which each of the segments is to adopt to be compared with the state which it had previously. Each alteration of a digit involves a change of state of only certain of the segments and it is only in respect of these segments that charge is injected. By effecting simultaneously the changes of state in the sense of colouration and the changes of state in the sense of blanking out, it is also possible to improve the legibility of the digits displayed at the instant of their alteration and, during corrections of the values displayed, accept a relatively rapid rate of alteration, in spite of the slowness of the colouration and of the blanking out which is inherent in an electrochromic display.

To allow the user to correct the setting of the watch, it has two push buttons A and B closing contacts 13 and 14, respectively, when they are pressed. These contacts 13 and 14 are connected to de-bouncing circuits 15 and 16 which are conventional and therefore not described in detail here; they are arranged to deliver at their outputs 15a and 16a a logical "0" or "1" signal according to whether the contact to which they are connected is open or closed. They are moreover strobed by the output of the frequency divider 2 in such a manner that, on the closing or opening of a contact, the corresponding output changes to "1" or "0" at the same time as the output signal of the divider 2 so changes.

The output 15a of the circuit 15 is connected to the inputs 17a and 18a of two AND gates 17 and 18 and also to the input 19a of a HAND gate 19. The output 16a of the circuit 16 is connected to the input of a monostable circuit 32 arranged so that its output, which is normally in the "0" stage, delivers a "1" pulse of say one millisecond every time its input changes from "0, that is to say every time the push bottom B is pressed.

The output 32a of the monostable 32 is connected to the input 20a of an AND gate 20 and to the input 21a of a counter 21 formed by two flip-flops and arranged so as to be able to take, successively, three different states numbered 0, 1 and 2. The flip-flops of the counter 21 are moreover connected so that the counter counts on the negative edges of the signal applied at its input, that is to say at the end of the pulses delivered by the monostable 32.

The output of the frequency divider 2 is connected to the second input 17b of the gate 17, the output 17c of which is connected to the inputs 22a, 23a and 24a of three AND gates 22, 23 and 24. The output 18c of the gate 18 is connected to the input 25a of a NOR gate 25 and the output 19c of the gate 19 is connected to the input 26a of a NAND gate 26 and to a second input 22b of the gate 22. The output 20c of the gate 20 is connected to the reset inputs R of the seconds counter 3 and the frequency divider 2.

The counter 21 is combined in manner known and here not described with a decoder whose three outputs 21b, 21c and 21d take the logical "1" state successively and individually when the counter 21 is in its states 0, 1 and 2, respectively. The output 21b is connected to the input 27a of a NOR gate 27, the output 21c is connected to the input 11a of the circuit 11 through an inverter 28 and to the input 24b of the gate 24. The output 21d is connected to the inputs 18b, 22c and 23b of the gates 18, 22 and 23 and also to the input 11b of the circuit 11 through an inverter 29. The outputs 22d, 23d and 24c of the gates 22, 23 and 24 are connected to the inputs 4b, 6b and 9b respectively of the gates 4, 6 and 9. The output 25c of the gate 25 is connected to the inputs 8b, 27b and 31b of the gates 8, 27 and 31, and the output 26c of the gate 26 is connected to the inputs 19b and 23c of the gates 19 and 23. The output 27c of the gate 27 is connected to the inputs 20b and 25b of the gates 20 and 25, while, finally, the input 26b of the gate 26 is connected to the output 5b of the minutes units counter 5 through an inverter 30.

The circuit operates in the following manner. At normal times, that is to say as long as the user does not wish to set his watch, the outputs 15a and 16a of the debouncing circuits 15 and 16 are in the logical "0" state and the outputs 21b, 21c and 21d of the counter 21 are in the logical "1","0" and "0" state respectively. It can therefore be seen that the divider 2 and the seconds counter 3, minutes units counter 5, tens-of-minutes counter 7 and hours counter 10 are connected in cascade and operate normally. The reset inputs R of the divider 2 and the counter 3, and also the inputs 4b, 6b and 9b of the gates 4, 6 and 9, are in the logical "0" state and the inputs 8b and 31b of the gates 8 and 31 are in the logical "1" state. The contents of the counters 5, 7 and 19 are displayed by the display device 12, because the inputs 11a and 11b of the assembly 11 are both in the logical "1" state. The watch is therefore working normally.

If the user desires to correct the indication of the hours displayed by his watch, he first presses the push button B. At the end of the pulse delivered by the circuit 32 in response to this action, the counter 21 changes from its state 0 to its state 1, the effect of which is to cause the outputs 21b and 21c to change to "0" and "1," respectively, the output 21d remaining at "0." The input 11a of the decoder and display driver circuit 11 therefore changes to "0," which completely blanks out the minutes display and indicates to the user that he has put his watch into its hours correction mode.

If the user then presses the push button A, the input 17a of the date 17 changes to "1" and the output pulses of the divider 2 are sent via the gate 24, the input 24b of which is maintained at "1, " to the input 9b of the gate 9 and therefore to the hours counter 10, the contents of which then change at the rate of one unit per second, as long as the user maintains his pressure on the push button A. It should be noted that during this time the inputs 22c and 23b of the gates 22 and 23 are at "0," which prevents the output pulses of the divider 2 transmitted by the gate 17 to their inputs 22a and 23a reaching the counters 5 and 7. This correction therefore has no effect on the minutes units or tens-of-minutes counter and can therefore be used, for example, when the user of the watch passes from one time zone to another.

If the user desires to correct the indication of the minutes displayed by his watch, he presses the push button B a second time. At the end of the pulse delivered by the monostable 32, the outputs 21c and 21d of the counter 21 change to "0" and "1," respectively, so that the hours display is blanked out, whereas the minutes display reappears, which indicates to the user that his watch is in its minutes correction mode.

As long as the push button A is not actuated, the input 19a of the flip-flop formed by the gates 19 and 26 is in the "0" state, which imposes the logical "1" and "0" states, respectively, at the outputs 19c and 26c of this flip-flop. When the user presses the push button A, the output pulses of the divider 2 are again transmitted by the gate 17.

These pulses now reach the minutes units counter 5, because the inputs 26b and 22c of the gate 22 are at "1," but not the tens-of-minutes counter 7 and the hours counter 10, because the inputs 23c and 24b of the gates 23 and 24 are in the "0" state. The contents of the minutes units counter 5 therefore change at the rate of one unit per second as long as the user maintains his pressure on the push button A and this causes the procession of the successive values of the corresponding digit on the display 12. When the contents of the counter 5 change from the value 9 to the value 0, its output 5b delivers a pulse. This pulse increases the contents of the counter 7 by one unit, as during normal working of the watch; it moreover causes the flip-flop formed by the gates 19 and 25 to change state, the input 19a thereof being now in the "1" state. The output 19c therefore changes to the "0" state, which blocks the gate 22 and prevents the following pulses coming from the output of the divider 2 reaching the input of the counter 5, which therefore remains in the state in which the display of the minutes units shows the digit 0. The output 26c of the flip-flop 19-26 changes to "1," the effect of which is that the output pulses of the divider can now pass through the gate 23 and reach the tens-of-minutes counter 7, the contents of which increase in turn by one unit per second as long as the user maintains his pressure on the push button A, which causes the successive values of the tens-of-minutes digit to run off on the display 12.

When the user releases the push button A after the tens-of-minutes digit has reached the desired value, the flip-flop 19-26 resumes its initial state, because of the "0" state which appears at its input 19a. Therefore, if the user presses the push button A again, it will again be the minutes units counter 5 which will receive the pulses from the output of the divider 2 through the gates 17, 22 and 4. The user will thus be able to bring this counter to the desired value.

It should be noted that, as soon as the user presses the push button A when his watch is in the minutes correction mode, that is to say when the output 21d of the counter 21 is in the "1" state, the output 18c of the gate 18 changes to "1," which causes the flip-flop formed by the gates 25 and 27 to change state. The outputs 25c and 27c of this flip-flop therefore assume the "0" and "1" states, respectively. The input 31b of the gate 31 therefore changes to "0," which prevents the pulses delivered by the output of the seconds counter 3 from reaching the minutes counter 5. Likewise, the input 8b of the gate 8 changes to "0," which prevents a pulse possibly issuing from the tens-of-minutes counter 7 when its contents change from 5 to 0 from reaching the hours counter 10. The contents of the hours counter cannot therefore be changed inadvertently during the correction of the tens-of-minutes counter.

Moreover, the input 20b of the gate 20 changes to the "1" state so that, when the user presses the push button B a third time to put his watch back into its normal operation mode, the pulse which appears at the output 32a of the monostable 32 is transmitted by the gate 20 to the inputs R of the divider 2 and the seconds counter 3, which resets these counters to zero. At the end of this pulse, the counter 21 resumes its state 0 in which its outputs 21b, 21c and 21d are respectively at "1," "0" and "0."

The outputs 25c and 27c of the memory 25-27 therefore resume their "1" and "0" states, respectively; the gates 31 and 8 again allow the pulses which they receive at their inputs 31a and 8a to pass, the gates 20, 22, 23 and 24 have their outputs at "0" because they all have at least one input at "0," and the inputs 11a and 11b of the circuit 11 are both in the "1" state. The watch is therefore again in its normal working state.

The resetting of the seconds counter 3 and the divider 2 by the third pressure on the push button B enables the watch to be made to start again in synchronism with a time signal and allows it to be ensured that the counter 5 will receive the first pulse from the counter 3 exactly one minute after this time signal.

The working of the watch will be illustrated by a practical example. The user finds that, for some reason his watch is not longer right and is displaying say 8.48 (8.48 a.m.) when the reference clock indicates that in reality the time is 11.22 a.m. He then carries out the following operations:

Pressure on the push button B: the minutes display disappears or is blanked out.

Maintained pressure on the push button A: the digits of the hours display run off in procession and indicate successively 8, 9, 10 and 11.

Release of the push button A.

Pressure on the push button B; the hours display disappears, the minutes display reappears.

Maintained pressure on the push button A: the minute display runs off in procession and indicates successively 48, 49, 50, 00, 10, 20.

Release of the push button A.

Maintained pressure on the push button A: the minutes display recommences to run off the indicates successively 20, 21, 22, 23.

Release of the push button A.

Pressure on the push button B at the instant when some time signal indicates that it is exactly 11.23 a.m.: the hours display reappears; the watch is right and recommences to work normally.

In another embodiment, instead of the minutes units counter 5 being formed by four flip-flops interconnected in conventional BCD manner, it could be constituted by a first counter stage having a counting capacity of 5, the input of which would be connected to the output 4c of the gate and the output of which would be connected via the gate 6 to a second counter stage having a counting capacity of 2. The information of these two counter stages, forming a bi-quinary counter with a counting capacity of 10, would then be processed by the decoder circuit 11 to determine the digit of the minutes units. The output of the binary counter stage would be directly connected to the input 7a of the tens-of-minutes counter 7. The output of the quinary counter stage would be connected to the flip-flop 19-26, so that the latter would change state when the digit of the minutes units reaches the value 0 or 5. In this embodiment, the procession of the number of minutes displayed would be, during the first stage of change, for example, as follows: 23, 24, 25, 30, 35, 40, etc.

The application of the described technique is not limited to the correction of minutes counters in a watch. It could also be applied to other counters such as that for the date or the hours in a watch displaying the latter from 0 to 23. It could likewise be applied to the preselection of the hour and the minute at which an alarm is to be switched on.

Nor is the application limited to the correction of counters in the field of horology. The invention could be used without difficulty for preselecting counters which are to count a given number of parts or operations in the field of automatic machine control, or a given number of any events in the field of instrumentation in general.

In these fields, the invention could moreover be generalized for the correction of preselection of counters capable of counting numbers having more than two decimal digits. It would be sufficient to provide switching means comparable with the means formed by the flip-flop 19-26 and the gates 22 and 23 of the example hereinbefore described and which are arranged in such manner that the correction pulses are automatically directed to a hundreds counter when the tens counter reaches a given value, for example 0, and then to a thousands counter when the hundreds counter also reaches a given value, which may again be 0, etc.

In such an arrangement first, second and third flip-flops would be required, to be set as the units, tens and hundreds respectively reach 0. Moreover the resetting of the flip-flops would depend on which were set so that at the end of the first depression of button A, the third flip-flop resets, at the end of the second depression the second flip-flop resets and at the end of the third depression the first flip-flop resets. Four depressions of button A then preset thousands, hundreds, tens and units in that order. Simple logic suffices to control the setting of the flip-flops in order and resetting in reverse order.

While a preferred embodiment of the invention has been shown and described in some detail, it will be understood that this description and the accompanying drawing are offered merely by way of example, and that various changes and modifications may be made without departing from the spirit of the invention as particularly defined in the following claims.

What is claimed is:

1. An electronic time-piece comprising:
   means for producing time-base pulses;
   means for counting said time-base pulses comprising a first counter and a second counter, said first and second counter being serially coupled;
   means coupled to said counting means for displaying indicia representing the count of said first and second counters;
   means for producing a manual control signal;
   means for producing setting pulses;
   means responsive to said manual control signal for applying said setting pulses to said first counter; and
   means responsive to a predetermined count of said first counter for disabling counting of setting pulses by said first counter and enabling counting of said setting pulses by said second counter.

2. The electronic time-piece of claim 1, wherein said count of said first counter is cyclically changed from zero to nine by said counting or by said setting pulses, and wherein said one predetermined count is equal to zero.

3. The electronic time-piece of claim 1, wherein said first counter comprises a quinary counter and a one bit binary counter, and said last named means is responsive to the count zero and to the count five of said first counter for disabling counting of said setting pulses by said first counter and enabling counting of said setting pulses by said second counter.

4. The electronic time-piece of claim 1, 2 or 3, wherein said time-base pulse producing means comprises means for producing a time base signal and a frequency divider responsive to said time base signal for producing said time-base pulses at a one pulse per minute frequency, said first counter being a units of minutes counter and said second counter being a tens of minutes counter.

* * * * *